US008341243B2

(12) United States Patent
Odaka et al.

(10) Patent No.: US 8,341,243 B2
(45) Date of Patent: Dec. 25, 2012

(54) INFORMATION PROCESSING APPARATUS, METHOD AND PROGRAM

(75) Inventors: Kenji Odaka, Yokohama (JP); Satoshi Ozaki, Kawasaki (JP); Eiji Tokita, Kawasaki (JP); Shirou Wakayama, Kawasaki (JP); Yoshiki Terashima, Yokohama (JP); Kensaku Fujimoto, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 295 days.

(21) Appl. No.: 12/581,416

(22) Filed: Oct. 19, 2009

(65) Prior Publication Data

US 2010/0198945 A1 Aug. 5, 2010

(30) Foreign Application Priority Data

Jan. 30, 2009 (JP) ................................. 2009-019677

(51) Int. Cl.
*G06F 15/16* (2006.01)
(52) U.S. Cl. .......................... 709/219; 709/217; 709/245
(58) Field of Classification Search .................. 709/245, 709/217, 219
See application file for complete search history.

(56) References Cited

U.S. PATENT DOCUMENTS

| 2003/0061305 A1* | 3/2003 | Copley et al. ................. 709/217 |
| 2008/0168533 A1 | 7/2008 | Ozaki et al. ........................ 726/1 |
| 2008/0219639 A1 | 9/2008 | Terashima et al. .............. 386/68 |
| 2008/0288536 A1* | 11/2008 | Pfeiffer et al. ............. 707/104.1 |
| 2009/0234789 A1 | 9/2009 | Odaka et al. ..................... 706/48 |
| 2009/0244385 A1 | 10/2009 | Wakayama et al. ........... 348/584 |
| 2009/0249425 A1 | 10/2009 | Teramoto et al. ............. 725/120 |

FOREIGN PATENT DOCUMENTS

| JP | 2005-260554 A | | 9/2005 |
| JP | 2005260554 A | * | 9/2005 |
| JP | 2006-301788 A | | 11/2006 |
| JP | 2006301788 A | * | 11/2006 |
| JP | 2008-033925 A | | 2/2008 |
| JP | 2008-152259 A | | 7/2008 |

OTHER PUBLICATIONS

U.S. Appl. No. 12/545,556, filed Aug. 21, 2009, Odaka et al.
International Search Report dated Apr. 19, 2011 from Japanese Patent Application No. 2009-019677.

* cited by examiner

*Primary Examiner* — Ario Etienne
*Assistant Examiner* — Hee Soo Kim
(74) *Attorney, Agent, or Firm* — Ohlandt, Greeley, Ruggiero & Perle, L.L.P.

(57) ABSTRACT

An apparatus includes unit storing scripts includes a tree structure, each of the scripts including at least one of a child-node script and content, unit selecting a parent-node script among the scripts, and acquiring to analyze a child-node script if the child-node script exists, unit acquiring content if content exists, unit retrieving substitute content if the acquisition of content ends in failure and if content indicates retrieving substitute content, unit retrieving the substitute-child-node script if the acquisition of the child-node script ends in failure and if the child-node script indicates retrieving the substitute-child-node script, and retrieving the substitute-parent-node script when content or the child-node script shows retrieving the substitute-parent-node script, unit acquiring substitute content when substitute content is found, unit acquiring the substitute-child-node script and the substitute-parent-node script when the substitute-child-node script and the substitute-parent-node script are found, respectively, and unit acquiring a change script.

11 Claims, 18 Drawing Sheets

```xml
<?xml version="1.0" encoding="UTF-8"?>
<script id="morning_news">
  <scriptmeta>
    <name>Morning news information</name>
    <author>tshida taro</author>
    <genre>news</genre>
    <keyword>News, morning</keyword>
    <comment>Provide necessary information before leaving in morning</comment>
  </scriptmeta>
  <playlist>
    <subscript id="daily_news">
      <meta>
        <keyword>Daily news</keyword>
      </meta>
      <control>
        <alternate>no</alternate>
        <mandatory>yes</mandatory>
      </control>
    </subscript>
    <subscript id="marumaru_weather">
      <meta>
        <keyword>Weather forecast</keyword>
      </meta>
      <control>
        <alternate>yes</alternate>
        <mandatory>yes</mandatory>
      </control>
    </subscript>
    <subscript id="sports_news">
      <meta>
        <keyword>Sports news</keyword>
      </meta>
      <control>
        <alternate>yes</alternate>
        <mandatory>no</mandatory>
      </control>
    </subscript>
  </playlist>
</script>
```

FIG. 4

```xml
<?xml version="1.0" encoding="UTF-8"?>
<script id="marumaru_weather">
  <scriptmeta>
    <name>Marumaru weather forecast</name>
    <author>yoshiz ishihama</author>
    <genre>weather</genre>
    <keyword>Weather forecast, weather forecaster</keyword>
    <comment>Recommended weather forecast by weather forecaster marumaru</comment>
  </scriptmeta>
  <playlist>
    <subscript id="kyouasu_weather">
      <meta>
        <keyword>Today's and tomorrow's weather</keyword>
      </meta>
      <control>
        <alternate>yes</alternate>
        <mandatory>yes</mandatory>
      </control>
    </subscript>
    <content url="otenki.jp/weekly">
      <meta>
        <keyword>Weekly weather,</keyword>
      </meta>
      <control>
        <alternate>yes</alternate>
        <mandatory>yes</mandatory>
      </control>
    </content>
    <content url="amederu.jp/">
      </meta>
        <keyword>Rain information, amederu</keyword>
      </meta>
      <control>
        <alternate>no</alternate>
        <mandatory>yes</mandatory>
      </control>
    </content>
    <content url="typhoon.jp/">
      <meta>
        <keyword>Typhoon information</keyword>
      </meta>
      <control>
        <alternate>no</alternate>
        <mandatory>no</mandatory>
      </control>
    </content>
  </playlist>
</script>
```

F I G. 5

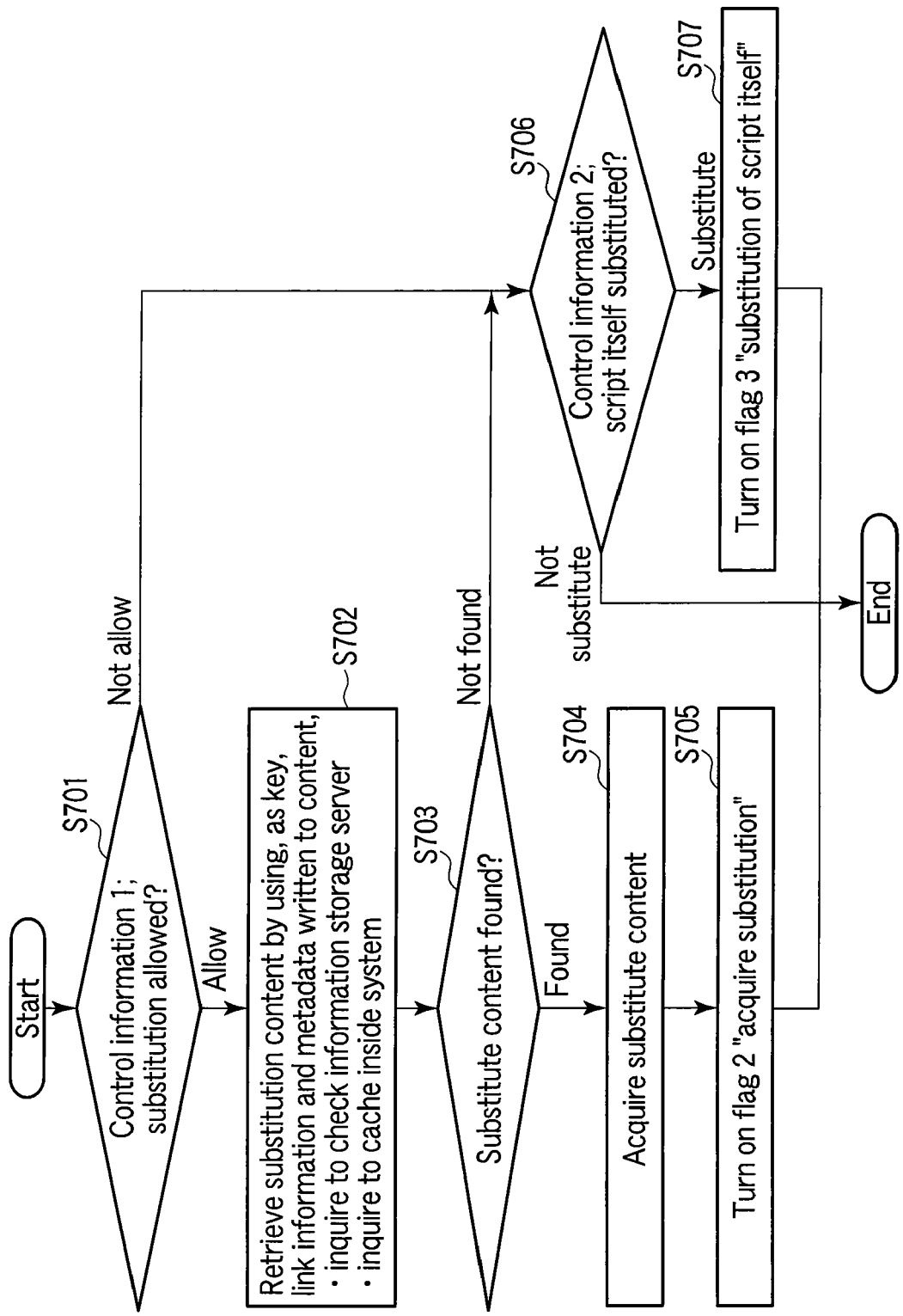
F I G. 7

```xml
<?xml version="1.0" encoding="UTF-8"?>
<script id="marumaru_weather">
  <scriptmeta>
    <name>Marumaru weather forecast</name>
    <author>yoshiz ishihama</author>
    <genre>weather</genre>
    <keyword>Weather forecast, weather forecaster</keyword>
    <comment>Recommended weather forecast by weather forecaster marumaru</comment>
  </scriptmeta>
  <playlist>
    <subscript id="kyouasu_weather">
      <meta>
        <keyword>Today's, and tomorrow's weather</keyword>
      </meta>
      <control>
        <alternate>yes</alternate>
        <mandatory>yes</mandatory>
      </control>
    </subscript>
    <content url="sankaku-tenki.jp/weekly">
      <meta>
        <keyword>Weekly weather</keyword>
      </meta>
      <control>
        <alternate>no</alternate>
        <mandatory>yes</mandatory>
      </control>
    </content>
    <content url="amederu.jp/">
      </meta>
        <keyword>Rain information, amederu</keyword>
      </meta>
      <control>
        <alternate>no</alternate>
        <mandatory>yes</mandatory>
      </control>
    </content>
    <content url="typhoon.jp/">
      <meta>
        <keyword>Typhoon information</keyword>
      </meta>
      <control>
        <alternate>no</alternate>
        <mandatory>no</mandatory>
      </control>
    </content>
  </playlist>
</script>
```

FIG. 10

```xml
<?xml version="1.0" encoding="UTF-8"?>
<script id="batsubatsu_weather">
  <scriptmeta>
    <name>Batsubatsu weather forecast</name>
    <author>ai kaitou</author>
    <genre>weather</genre>
    <keyword>Weather forecast</keyword>
    <comment>Weather information by forecaster batsubatsu</comment>
  </scriptmeta>
  <playlist>
    <content url="batsu-weather.jp/daily/">
      <meta>
        <keyword>Today's and tomorrow's weather forecast</keyword>
      </meta>
      <control>
        <alternate>no</alternate>
        <mandatory>yes</mandatory>
      </control>
    </content>
    <content url="batsu-weather.jp/weekly">
      <meta>
        <keyword>Weekly weather forecast</keyword>
      </meta>
      <control>
        <alternate>no</alternate>
        <mandatory>yes</mandatory>
      </control>
    </content>
    <content url="batsu-weather.jp/ame/">
      </meta>
        <keyword>Rain information</keyword>
      </meta>
      <control>
        <alternate>no</alternate>
        <mandatory>yes</mandatory>
      </control>
    </content>
    <content url="batsu-weather.jp/typhoon/">
      <meta>
        <keyword>Typhoon information</keyword>
      </meta>
      <control>
        <alternate>no</alternate>
        <mandatory>yes</mandatory>
      </control>
    </content>
    <content url="batsu-weather.jp/aikotoba/">
      <meta>
        <keyword>Very short memo, great information</keyword>
      <meta>
      <control>
        <alternate>no</alternate>
        <mandatory>yes</mandatory>
      </control>
    </content>
  <playlist>
</script>
```

FIG. 13

```xml
<?xml version="1.0" encoding="UTF-8"?>
<script id="morning_news">
  <scriptmeta>
    <name>Morning news information</name>
    <author>tshida taro</author>
    <genre>news</genre>
    <keyword>News, morning</keyword>
    <comment>Provide necessary information before leaving in morning</comment>
  </scriptmeta>
  <playlist>
    <script id="daily_news">
      <meta>
        <keyword>Daily news</keyword>
      </meta>
      <control>
        <alternate>no</alternate>
        <mandatory>yes</mandatory>
      </control>
    </subscript>
    <subscript id="batsubatsu_weather">
      <meta>
        <keyword>Weather forecast</keyword>
      </meta>
      <control>
        <alternate>yes</alternate>
        <mandatory>yes</mandatory>
      </control>
    </subscript>
    <subscript id="sports_news">
      </meta>
        <keyword>Sports news</keyword>
      </meta>
      <control>
        <alternate>yes</alternate>
        <mandatory>no</mandatory>
      </control>
    </subscript>
  </playlists>
</script>
```

F I G. 14

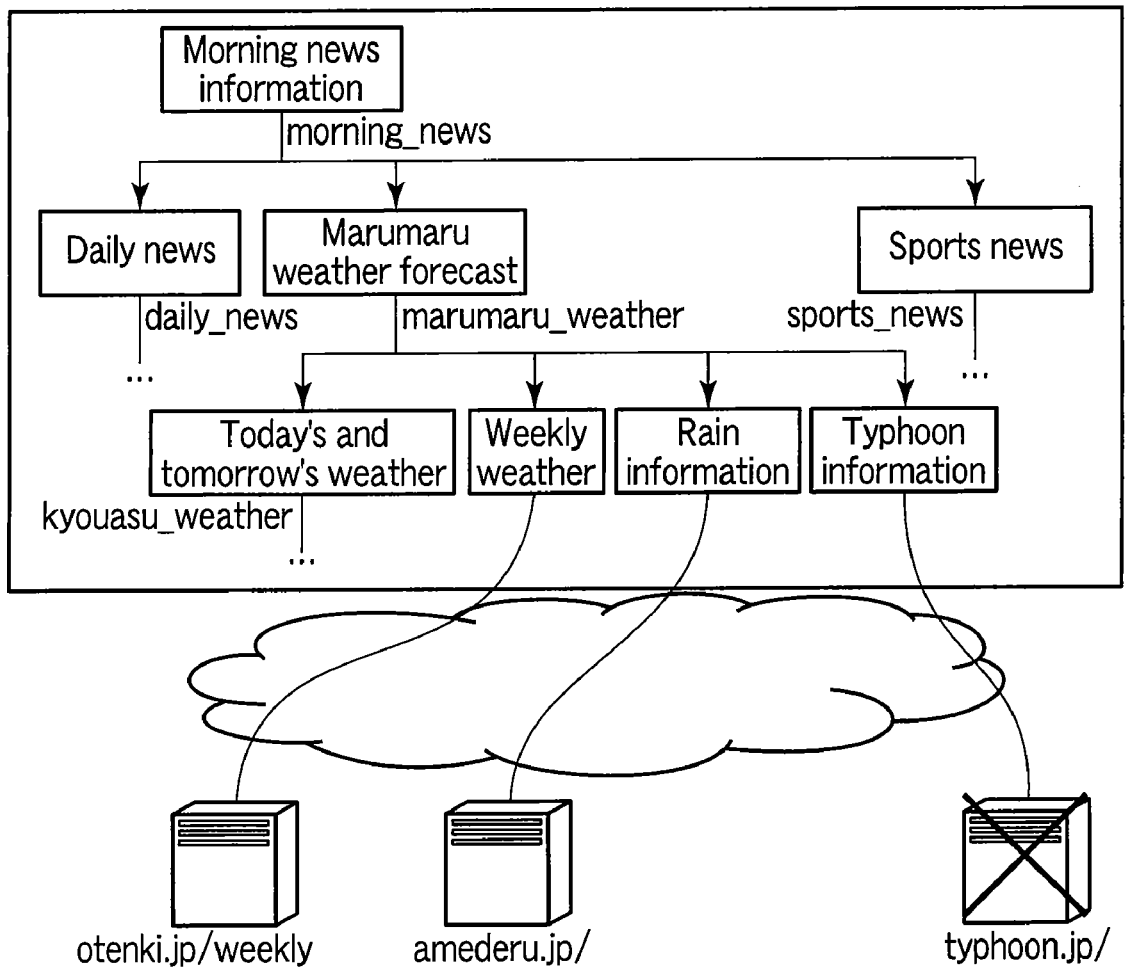
F I G. 16

```xml
<?xml version="1.0" encoding="UTF-8"?>
<script id="marumaru_weather">
  <scriptmeta>
    <name>Marumaru weather forecast</name>
    <author>yoshiz ishihama</author>
    <genre>weather</genre>
    <keyword>Weather forecast, weather forecaster</keyword>
    <comment>Recommended weather forecast by weather forecaster marumaru</comment>
  </scriptmeta>
  <playlist>
    <subscript id="kyouasu_weather">
      <meta>
        <keyword>Today's, and tomorrow's weather</keyword>
      </meta>
      <control>
        <alternate>yes</alternate>
        <mandatory>yes</mandatory>
      </control>
    </subscript>
    <content url="otenki.jp/weekly">
      <meta>
        <keyword>Weekly weather,</keyword>
      </meta>
      <control>
        <alternate>yes</alternate>
        <mandatory>yes</mandatory>
      </control>
    </content>
    <content url="amederu.jp/">
      </meta>
        <keyword>Rain information, amederu</keyword>
      </meta>
      <control>
        <alternate>yes</alternate>
        <mandatory>no</mandatory>
      </control>
    </content>
  </playlist>
</script>
```

FIG. 17

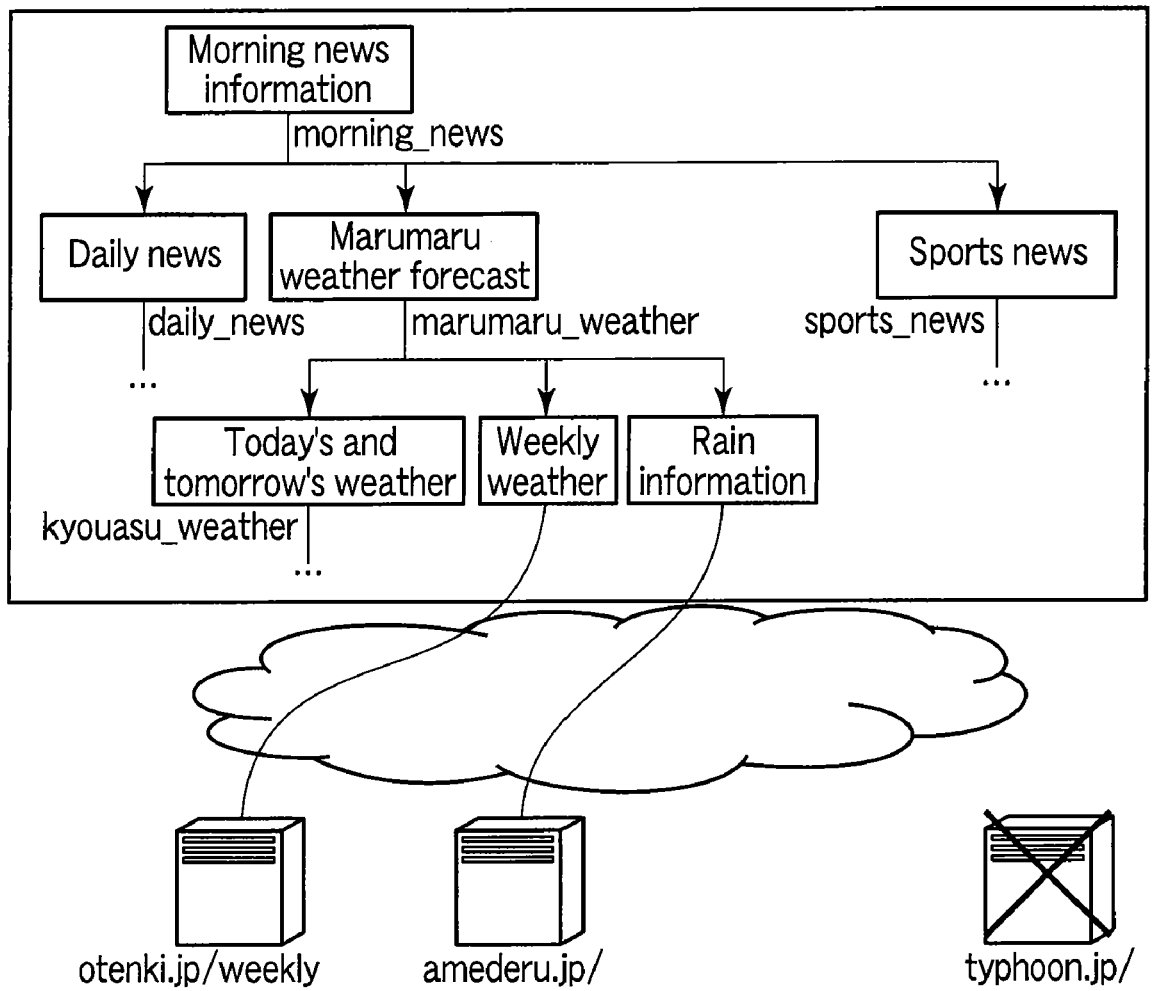
F I G. 18

INFORMATION PROCESSING APPARATUS, METHOD AND PROGRAM

CROSS-REFERENCE TO RELATED APPLICATIONS

This application is based upon and claims the benefit of priority from prior Japanese Patent Application No. 2009-019677, filed Jan. 30, 2009, the entire contents of which are incorporated herein by reference.

BACKGROUND OF THE INVENTION

1. Field of the Invention

The present invention relates to an information processing apparatus, a method and a program for combining to output a plurality of items of content.

2. Description of the Related Art

A system exists, which automatically selects a replay file in response to a replay characteristic from a plurality of media files having practically identical items of medium content. Meanwhile, techniques, automatically recommending content by using histories and metadata, have been mounted on products such as a DVD recorder, and have become existing techniques.

However, these techniques have not been developed on the assumption the case that disables these techniques from acquiring the media files and the content, but they have been developed with a focus on how to use a plurality of already obtained items of content (see, e.g., JP-A 2008-152259(KO-KAI)).

In equipment for combining the service content of a plurality of right holders in accordance with a certain script, there is a possibility of solely a part of items of the content suddenly becoming unusable. It is conceivable, as a cause, that a content provider stops providing a service temporarily or permanently, or the content becomes unusable because of a change in the content use condition (e.g., contract content or usage fee). If a script provider and a content provider are different from each other, there is such a problem that the script provider cannot recognize in advance to be not able to use the content.

However, in the foregoing conventional techniques, content managers, deciders of content to be reproduced, and recommenders are all the same. That is, when reproducing the content, since acquisition situations of the content are self-evident, the conventional techniques have not been developed on the assumption that the conventional techniques have been disabled from acquiring the content during replay.

BRIEF SUMMARY OF THE INVENTION

In accordance with an aspect of the invention, there is provided an information processing apparatus comprising: a first storage unit configure to store a plurality of scripts each of which comprises a tree structure, each of the scripts including a first child node script and first content, the first child node script indicating a first link to a child node of the script and including first script control information and second script control information, the first script control information indicating whether or not a substitute child node script substituting for a script of the child node is retrieved when acquisition of the script of the child node ends in failure, the second script control information indicating whether or not a first substitute parent node script substituting for a parent node script is retrieved, the parent node script indicating a script of a parent node, the first content indicating a second link to content and including first content control information and second content control information, the first content control information indicating whether or not substitute content substituting for the content is retrieved when acquisition of the content ends in failure, the second content control information indicating whether or not a second substitute parent node script substituting for the parent node script is retrieved, a script analysis unit configure to select one script as the parent node script among the scripts, analyze whether or not the substitute child node script and the first substitute parent node script are retrieved with reference to the first script control information and the second script control information that are included in a second child node script, respectively, the second child node script including one of child nodes of the parent node script and indicating a third link to a third child node script, analyze whether or not the substitute content and the second substitute parent node script are retrieved with reference to the first content control information and the second content control information that are included in second content, respectively, the second content including one of the child nodes and indicating a fourth link to third content, and acquire a third child node script and further analyze the third child node script if the third child node script exists, the third child node script being included in a link indicating the second child node script; a content acquisition unit configure to acquire the third content indicating the fourth link if the third content exists; a substitute content retrieval unit configure to retrieve the substitute content if the acquisition of the third content ends in failure and if it is analyzed by the script analysis unit that first content control information of the second content indicates retrieving the substitute content; a substitute script retrieval unit configure to retrieve the substitute child node script if the acquisition of the third child node script ends in failure and if it is analyzed by the script analysis unit that first script control information of the script of the child node indicates retrieving the substitute child node script, and to retrieve the substitute parent node script when one of the second content control information of the second content and the second script control information of the second child node script shows retrieving the substitute parent node script; a substitute content acquisition unit configure to acquire the substitute content when the substitute content is found; a substitute script acquisition unit configure to acquire the substitute child node script and the substitute parent node script when the substitute child node script and the substitute parent node script are found, respectively; and an acquisition unit configure to acquire a change script, in which at least one of first substitute content indicating a storage place of the substitute content as which the second content is rewritten, a first substitute child node script indicating a fifth link to the substitute child node script as which the second child node script is rewritten, and a substitute parent node script as which the parent node script is rewritten, is changed.

BRIEF DESCRIPTION OF THE SEVERAL VIEWS OF THE DRAWING

FIG. 4 is an exemplary view depicting a description example in Extensible Markup Language (XML) of the script;

FIG. 5 is an exemplary view depicting another example of the description example in XML of the script;

FIG. 7 is an exemplary flowchart depicting operations of a substitute content retrieval unit and of a substitute content acquisition unit;

FIG. 10 is an exemplary view depicting a script description example of substitute content;

FIG. 13 is an exemplary view depicting a script description example of a substitute script;

FIG. 14 is an exemplary view depicting another example of the script description example of the substitute script;

FIG. 16 is an exemplary view depicting an example of a state before a change in a script;

FIG. 17 is an exemplary view depicting a script description example when a change in script is performed; and FIG. 18 is an exemplary view depicting an example of a state after a change in script.

DETAILED DESCRIPTION OF THE INVENTION

Figure 1:
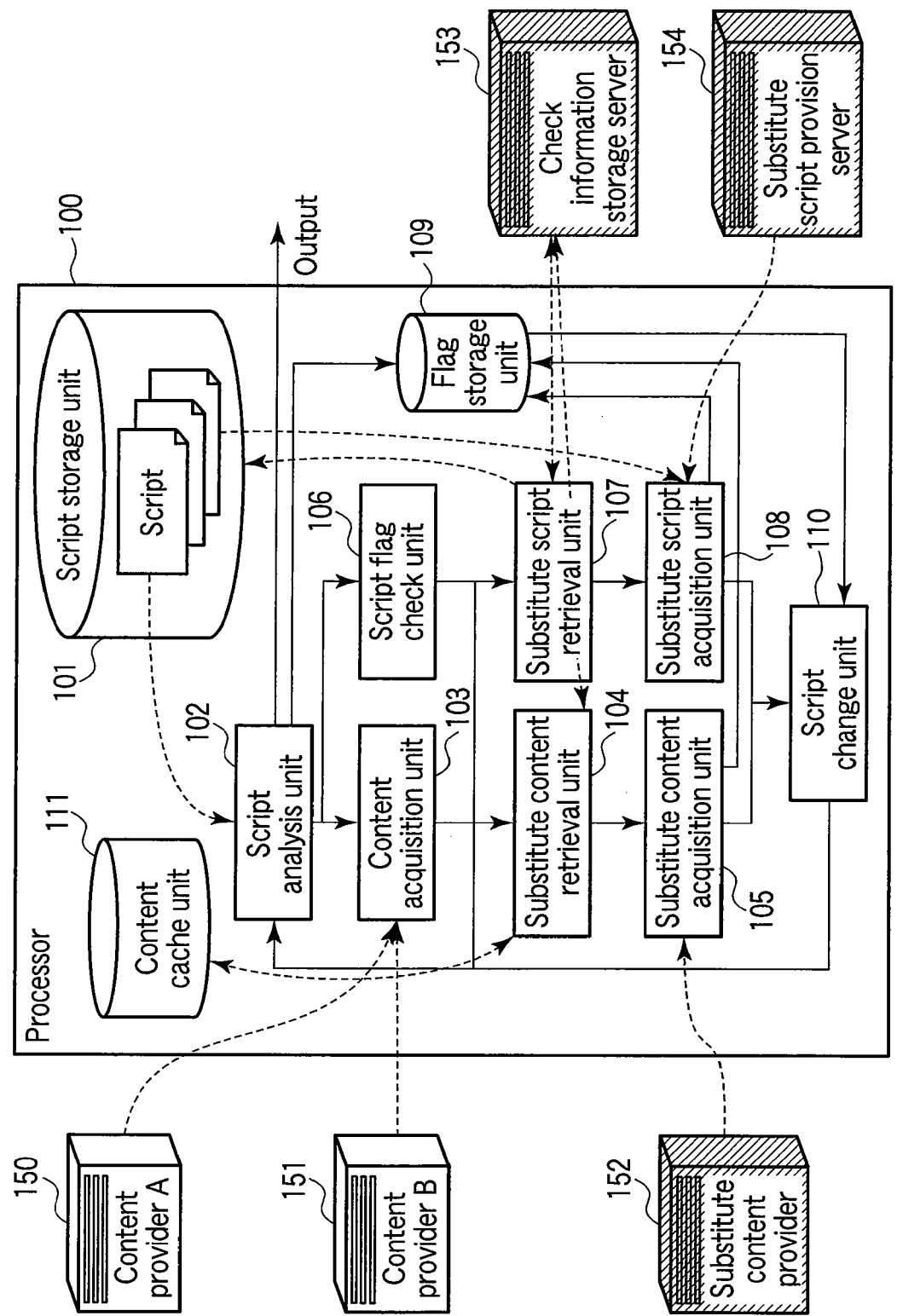
FIG. 1 is an exemplary block diagram of an information processing apparatus of an embodiment.

Hereinafter, an information processing apparatus, a method and a program regarding embodiments of the invention will be described in detail with reference to the drawings. In the following embodiments, the components designated by identical symbols perform the same operations and overlapped descriptions will be omitted.

According to the information processing apparatus, method and program, when a part of items of content becomes unusable, the content may be automatically replaced with substitute content.

The information processing apparatus regarding the embodiment of the invention will be explained with reference to FIG. 1. While the information processing apparatus regarding the embodiment is configured with a view to mount it on a terminal, the apparatus may be mounted on a server.

The information processing apparatus 100 regarding the embodiment includes a script storage unit 101, a script analysis unit 102, a content acquisition unit 103, a substitute content retrieval unit 104, a substitute content acquisition unit 105, a script flag check unit 106, a substitute script retrieval unit 107, a substitute script acquisition unit 108; a flag storage unit 109, a script change unit 110, and a content cache unit 111.

The script storage unit 101 stores a plurality of scripts. The script is created in methods of reception from a script provider on the Web, creation by the user of the information processing apparatus 100, and automatic creation in the information processing apparatus 100, and includes a play list, metadata, etc. The script will be described in detail later with reference to FIGS. 2 and 4. The script storage unit 101 sends scripts to the script analysis unit 102 and the substitute script acquisition unit 108.

The script analysis unit 102 reads a certain script from the script storage unit 101 to analyze the script by defining this script as a parent node script (or parent script). The parent node script means a case in which the play list having this script further includes scripts. The scripts included in the parent node script are called child node scripts (or child scripts). If the play list includes the content, the script analysis unit 102 sends the content to the content acquisition unit 103, and if the play list includes the scripts, the script analysis unit 102 acquires corresponding-scripts from the script storage unit 101. The script analysis unit 102 also sends flags owned by the content and the child node scripts in the play list to the flag storage unit 109. The flags indicate conditions as to whether the acquisition is completed successfully, or whether substitutes are acquired, and the details will be described later. When the script processing is completed, the script analysis unit 102 outputs the scripts received from the script change unit 110 to the outside.

The content acquisition unit 103 receives the scripts from the script analysis unit 102, and acquires the content from external content provider A 150 and a content provider B 151. When content acquisition is completed successfully, or when a substitute of the parent node script itself is needed, the content acquisition unit 103 sends the parent node script to the script analysis unit 102. If the content acquisition ends in failure, the content acquisition unit 103 sends the parent node script to the substitute content retrieval unit 104. The case of a failure of content acquisition means a case in which, for example, content from a content provider becomes unusable, because a use condition (e.g., contract content, a usage fee, etc., of a user) of the content has changed, or a content provider temporarily or permanently has stopped content provision.

The substitute content retrieval unit 104 retrieves the substitute content. The substitute content is a content that includes information content which is the same as or similar to the content specified by the first parent node script. The retrieval of the substitute content is performed with reference to the content cache unit 111 and an external check information storage server 153. If any substitute content is found through the retrieval, the content retrieval unit 104 sends the retrieval result to the substitute content acquisition unit 105.

The substitute content acquisition unit 105 acquires the substitute content from the external substitute content provider 152 on the basis of the retrieval result received from the substitute content retrieval unit 104. If the acquisition of the substitute content is completed successfully, the content acquisition unit 105 sends the flag to the flag storage unit 109, and sends the acquired content to the script change unit 110.

The script flag check unit 106 checks the flag included in the play list received from the script analysis unit 102. After the check, if no substitution for the script (parent node script or child node script) is needed, the check unit 106 sends the script to the script analysis unit 102. If a substitute script is needed, the script flag check unit 106 sends the script to the substitute script retrieval unit 107.

When performing substitution of the child node script, or when performing substitution of the parent node script, the substitute script retrieval unit 107 retrieves the substitute scripts. The retrieval for the substitute scripts is performed from the external check information storage server 153 and the script storage unit 101. If the retrieval has found a substitute script, the retrieval result is sent to the substitute script acquisition unit 108.

The substitute script acquisition unit 108 acquires the substitute scripts from an external substitute script provision server 154 or the script storage unit 101 in accordance with the retrieval result received from the substitute script retrieval unit 107. When the acquisition of the substitute scripts is completed successfully, the substitute script acquisition unit 108 sends the flags to the flag storage unit 109 and sends the acquired content to the script change unit 110.

The flag storage unit 109 stores a value of a flag owned by each item of content and each script, and the storage unit 109 sends the values to the script change unit 110 if necessary.

The script change unit 110 performs merger processing for the flags of the entire play list in response to the values of the flags received from the flag storage unit 109. Depending on the result of the merger processing, if there is a need to change the play list, the script change unit 110 rewrites the play list of the child node scripts or the parent node script. The script change unit 110 sends the written scripts to the script analysis unit 102.

The content cache unit 111 stores the cache of the content to be substituted, and overwrites the cache of the content acquired from the outside.

Figure 2:
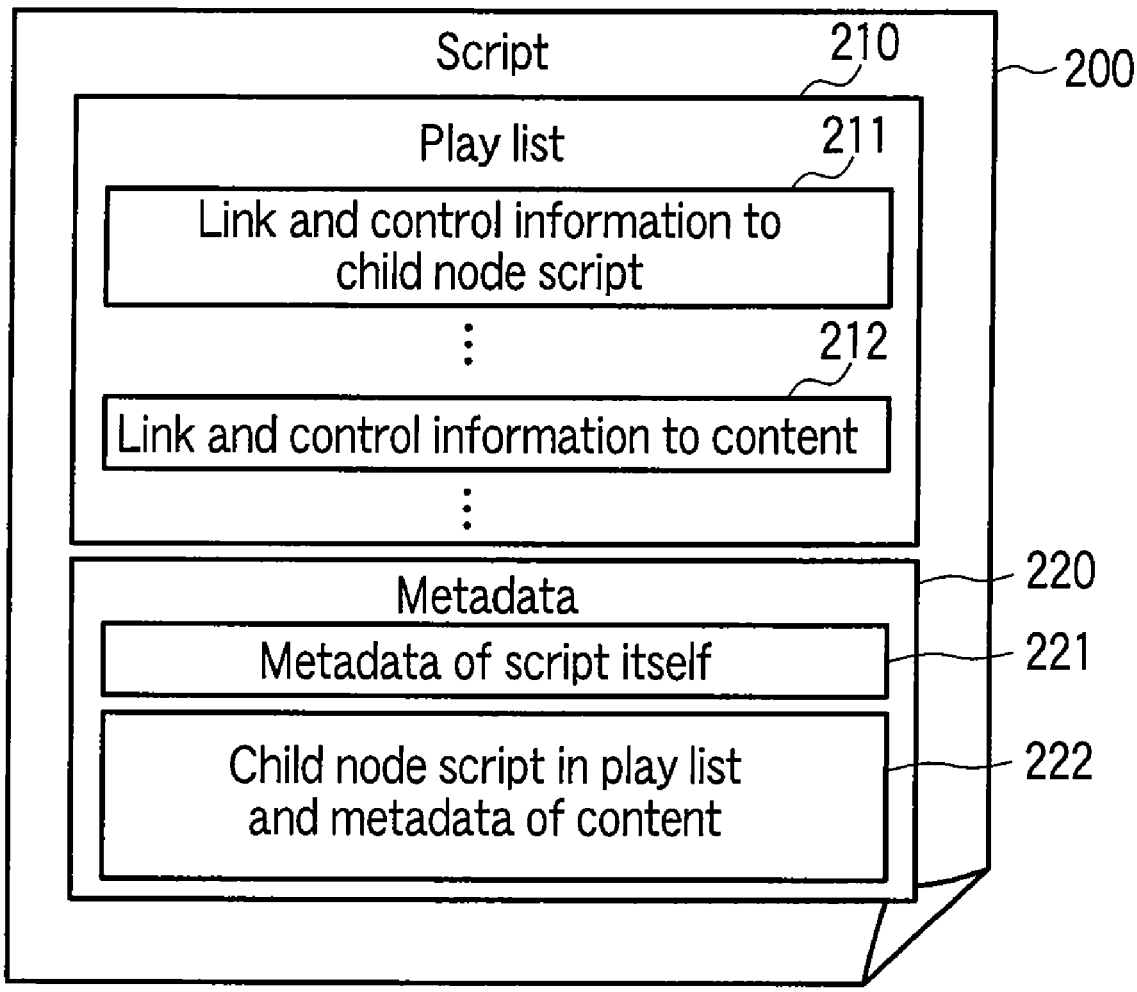
FIG. 2 is an exemplary view depicting a configuration of a script.
Figure 3:
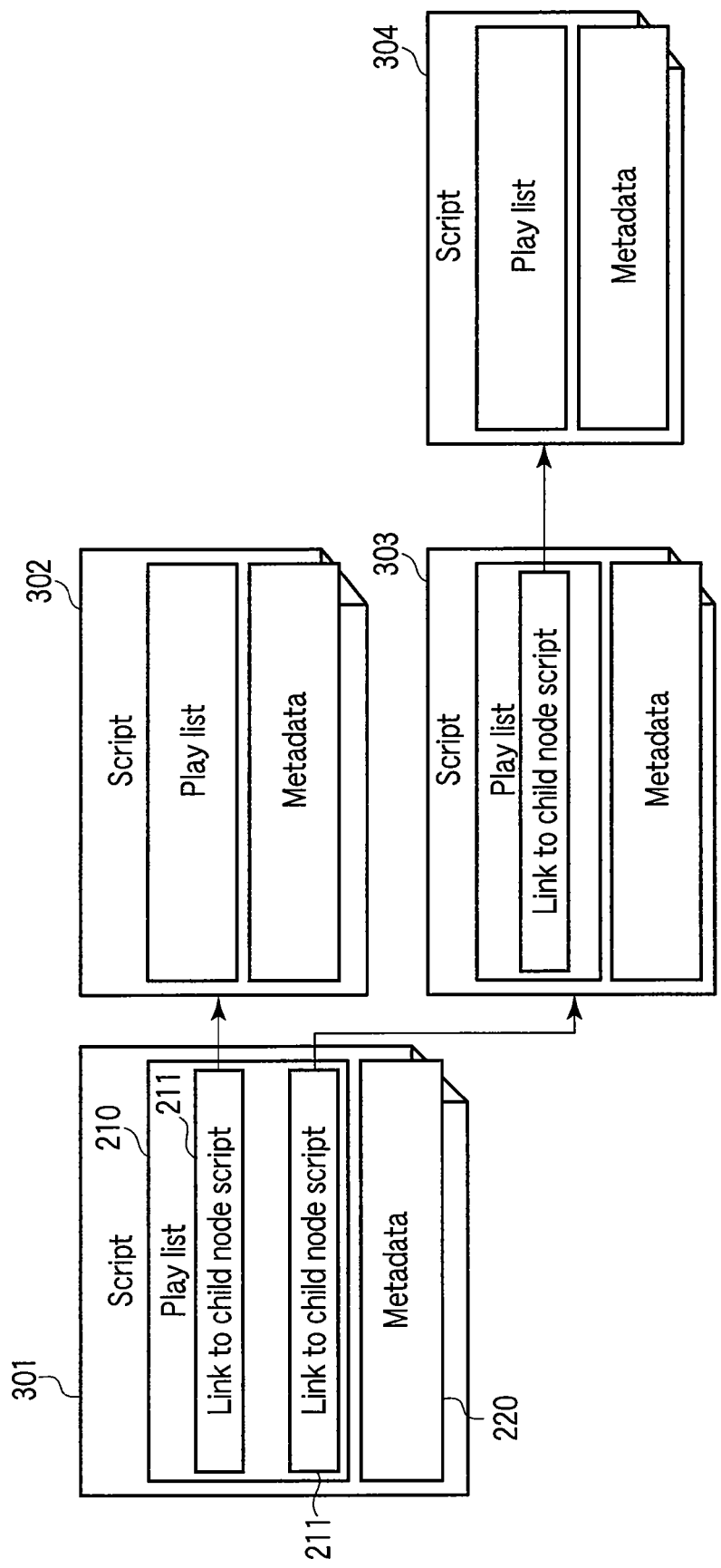
FIG. 3 is an exemplary view depicting a tree structure of the script.

Next, the script will be described with reference to FIGS. 2 and 3. A script 200 includes a play list 210 and metadata 220.

The play list 210 shows display order of service content, and, for example, the play list 210 shows which of the items of the content should be displayed. The content is acquired in the order arranged in the play list 210. The script includes at least one of the links to the child node script and control information 211, and the link to the content and control information 212. That is, the script 200 can be structured in a tree structure of a plurality of scripts. The link to the child node script and the control information 211 are used for expressing the link of the tree structure of the script and for describing the control information to the child node script.

An example of a structure formed by a tree structure is described with reference to FIG. 3. If a script 301 is defined as a parent node script (root, or root node), there is a link to scripts 302, 303 in the play list of the script 301, and this becomes the child node script. In the play list of the script 303, a link is established to a script 304 to be the next child node script. From the viewpoint of the script 304, the script 303 becomes a parent node script. In this way, a plurality of scripts may be used by combining them in a nesting state.

The link to the content and the control information 212 are used to describe the link information to the content provider such as the content provider A 150 and the content provider B 151 in FIG. 1, and the control information for the content indicated by the link to the content.

The metadata 220 is used for a description of attribute information including a name, a creator, a category, a keyword, right holder information, an explanation text, etc. The metadata 220 includes metadata 221 of a script itself for describing the attribute information of the script 200 itself, and includes the child node script linked in the play list 220, the child node script in the play list for describing the metadata of the content, and the metadata 222 of the content.

FIGS. 4 and 5 show examples in which the script 200 is described in an XML form.

FIG. 4 shows a script named as "Morning news information", and its content consists of a child node script named as "daily_news", a child node script named as "marumaru_weather", and a child node script named as "sports_news".

Among the child node scripts in FIG. 4, FIG. 5 shows a description example of the script of "marumaru_weather". The "marumaru_weather" script consists of a child node script named "kyouasu_weather", content named as "otenki.jp/weekly", content named as "amederu.jp/", and content named as "typhoon.jp/".

In each of the child node scripts, a part closed by a <script-meta> tag is metadata 221 of the script itself, a part closed by a <playlist> tag is the play list 210, a part closed by a <subscript> tag among the child elements is a link to the child node script and the control information 211, and a part closed by a <content> tag is the link to the content and the control information 212.

A part closed by the <meta> tag among the child elements of the <subscript> tag and the <content> tag is the child node script and metadata 222 of the play list.

An attribute "id" of the <subscript> tag is a link to the child node script, and determination of the script to be the child node is performed by matching with the attribute "id" of the <script> tag. An attribute "url" of the <content> tag is a link to the content.

A part described in the <control> tag among the child elements of the <subscript> tag and the <content> tag corresponds to the control information. Examples in FIGS. 4 and 5 describe the following two as the control information.

Control information 1: whether replacement should be performed when acquisition ends in failure.

Control information 2: whether substitution of a parent node script itself of a call out source should be performed when acquisition and substitution end in failure.

In terms of these two items of control information, the control information 1 is described as "yes" or "no" in an <alternate> tag, which is a child element of a <control> tag. In the case of "yes", when the acquisition of the content and the script ends in failure, the replacement by the substitution is performed, and in the case of "no", the replacement by the substitution is not performed. The control information 2 is described as "yes" or "no" in a <mandatory> tag, which is a slave element of the <control> tag, and in the case of "yes", when the acquisition and the acquisition of the substitution of the content and the script end in failure, the substitution of the parent node script itself, which is a node in a layer that is one higher than the present script, is performed, and in the case of "no", the substitution is not performed.

The following explanation will be described in a way in which an assembly closed by the <script> tag or the <content> tag is defined as one subject in the play list.

While the replay order of the play list is basically processed in the order of description, the script may be described in accordance with a grammar having a control structure of repetition, branch, and nesting.

<Content Collection Processing>

Next, a procedure for reading out a certain script and for processing the script from the script storage unit 101 will be described in detail with reference to FIGS. 4-8.

The script processing is proceeded by preparing the following three flags for each subject of the play list. It is assumed that all the flags are initially set to "off". The conditions by which each flag is turned "on" will be described as follows:

Flag 1: "Acquisition success"; Content or acquisition of the child node script ends successfully Flag 2: "Substitution acquisition"; Content or acquisition of child node script ends in failure, however, retrieval or acquisition of substitute content or substitute child node script end successfully Flag 3: "Substitution of parent node script itself"; Both the acquisition and substitution of content or the child node script end in failure, further the control information 2 is described as "yes".

The acquisition situation of the content is determined in accordance with whether necessary information can be acquired from the attribute "url" of the <content> tag.

Hereinafter, operations from the reading of the script to the rewriting of the script will be described in detail while referring to the flowchart of FIG. 6.

The script analysis unit 102 firstly reads a certain script as a parent node script from the script storage unit 101 (Step S601). Next, the script analysis unit 102 reads one subject written in the first section from the play list of the read parent node script (Step S602). Then, the script analysis unit 102 determines whether the read one subject is the content or the child node script (Step S603). If the read one subject is the content, the content acquisition unit 103 performs "content acquisition" processing (Step S604).

In Step S605, if the acquisition of the content ends successfully, the processing is returned to the script analysis unit 102, the flag 1: "acquisition success" of the one subject in processing in the play list is turned "on". Then, the script analysis unit 102 shifts to Step S611 in order to try to acquire the next one subject in the play list and determines whether or not the next one subject exists in the play list. If the next one subject exists, the script analysis unit 102 returns to Step S602 to perform the processing again. If the next one subject does not exist, the analysis unit 101 proceeds to Step S612.

In Step S605, if the acquisition of the content ends in failure, the processing is proceeded to Step S607 to perform "substitute content retrieval and acquisition" processing. The processing of the retrieval and acquisition of the substitute content will be described in detail with reference to FIG. 7.

<Retrieval and Acquisition of Substitute Content>

The script analysis unit 102 firstly checks the content of the control information 1 in the processing of the play list (Step S701). If the content of the <alternate> tag indicating the content of the control information 1 is "yes", the script analysis unit 102 determines that the replacement of the script may be allowed, and proceeds to Step S702 to retrieve the substitute content. If the control information 1 is "no", the script analysis unit 102 does not perform a content substitution, and proceeds to Step S706 in order to check the content of the control information 2.

The retrieval for the substitute content in Step S702 is performed through an inquiry to the external check information storage server 153, or through matching with the content in the content cache unit 111 by using the URLs of metadata and the content described in the script as a key. While a matching method for keys is based on complete matching, the method may adopt partial matching or searching of the related words from another dictionary to retrieve the substitute content by using the search result as a key. In terms of the retrieval of the substitute content, which of retrieval methods should be adopted may be described in the script.

If the content is not a single medium such as an image, voice or text, but is multimedia data described in a markup language such as Hyper Text Markup Language (HTML) and XML and its link, the acquisition of solely a part of the multimedia data may end in failure. In this case, the substitution of solely a part of items of data of which the acquisition ended in failure may be retrieved. At this time, for retrieval, the substitute content retrieval unit 104 may perform text analysis processing and signal processing of not only information described on the script, but also of the successfully acquired data to generate a retrieval key. Further, while the retrieval of the substitute content assumes the inquiry to the check information storage server 153 or the cache (content cache unit 111) in the system, if both the server 153 and the cache are available, which of them should be given the priority may be decided in the system or may be specified in the script. The priority of the inquiry may be directly described in the script.

In Step S703, if the substitution content has been found, the procedure proceeds to Step S704, and acquires the substitute content by the substitute content acquisition unit 105. As regards the one subject under processing in the play list, the substitute content acquisition unit 105 turns "on" the flag 2 "acquisition of substitution" (Step S705) sends the flag 2 to the flag storage unit 109, and returns to Step S607 from "END".

In Step S703, if the substitute content has not been found, in the same way as the case where the check of the control information 1 results in "no", the script analysis unit 102 proceeds to the check of the content of the control information 2 (Step S706). If the content of the control information 2 is "yes" (perform substitution of parent node script itself), the script analysis unit 102 proceeds to Step S707 to turn "on" the flag 3 (substitution of parent node itself), and returns to Step S607 from "END".

If the content of the control information is "no" (does not perform substitution of the parent node script itself), the script analysis unit 102 maintains the flag 3 "substitution of the parent node script itself" as "off", and returns to Step S607 from "END".

<Call Out Processing of Child Node Script>

Next, the processing in Step S603 in the case where the next one subject read in Step S602 is a child node script will be described.

Figure 6:
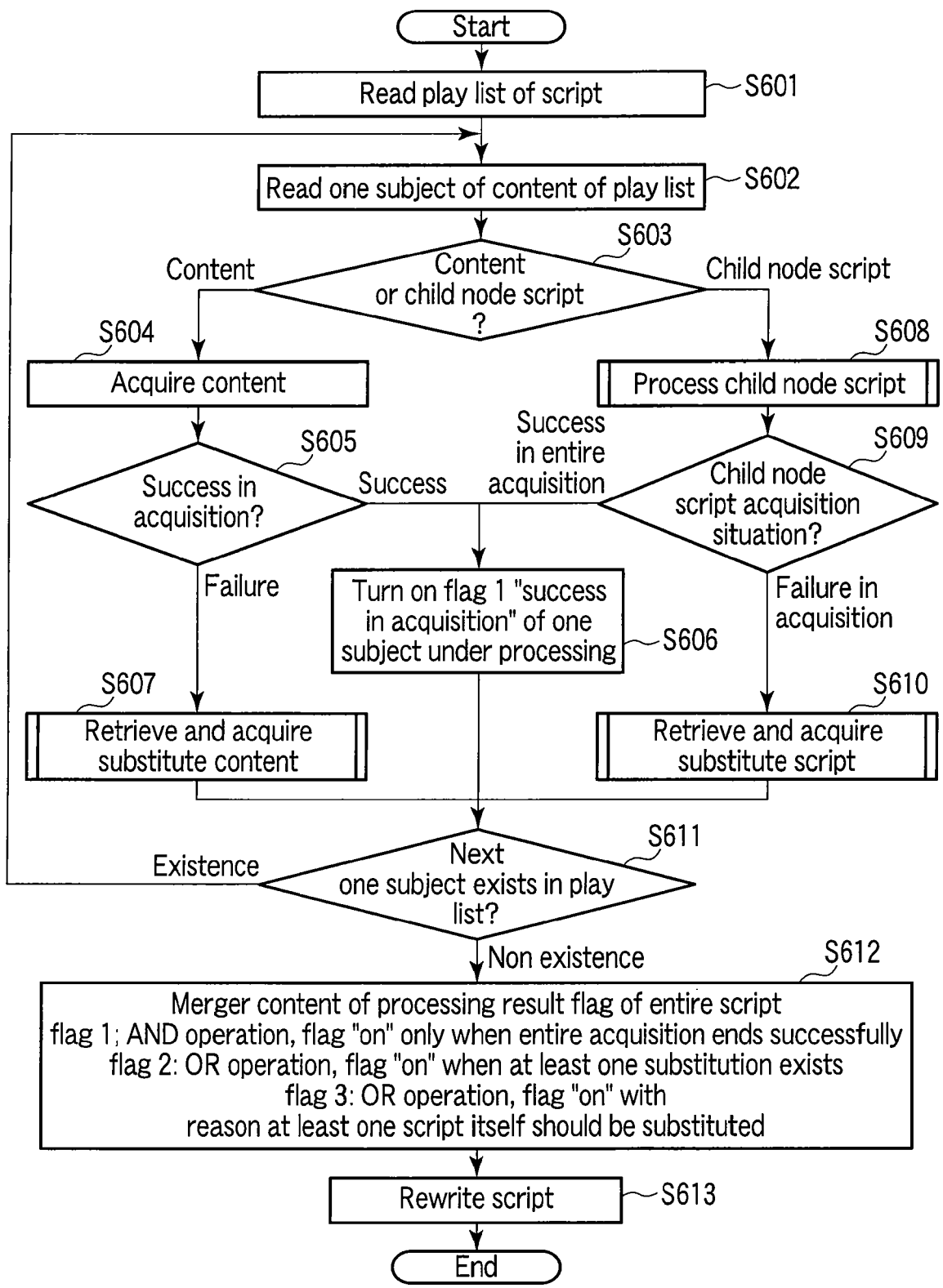
FIG. 6 is an exemplary flowchart depicting operations of an information processing apparatus regarding the embodiment.
Figure 8:
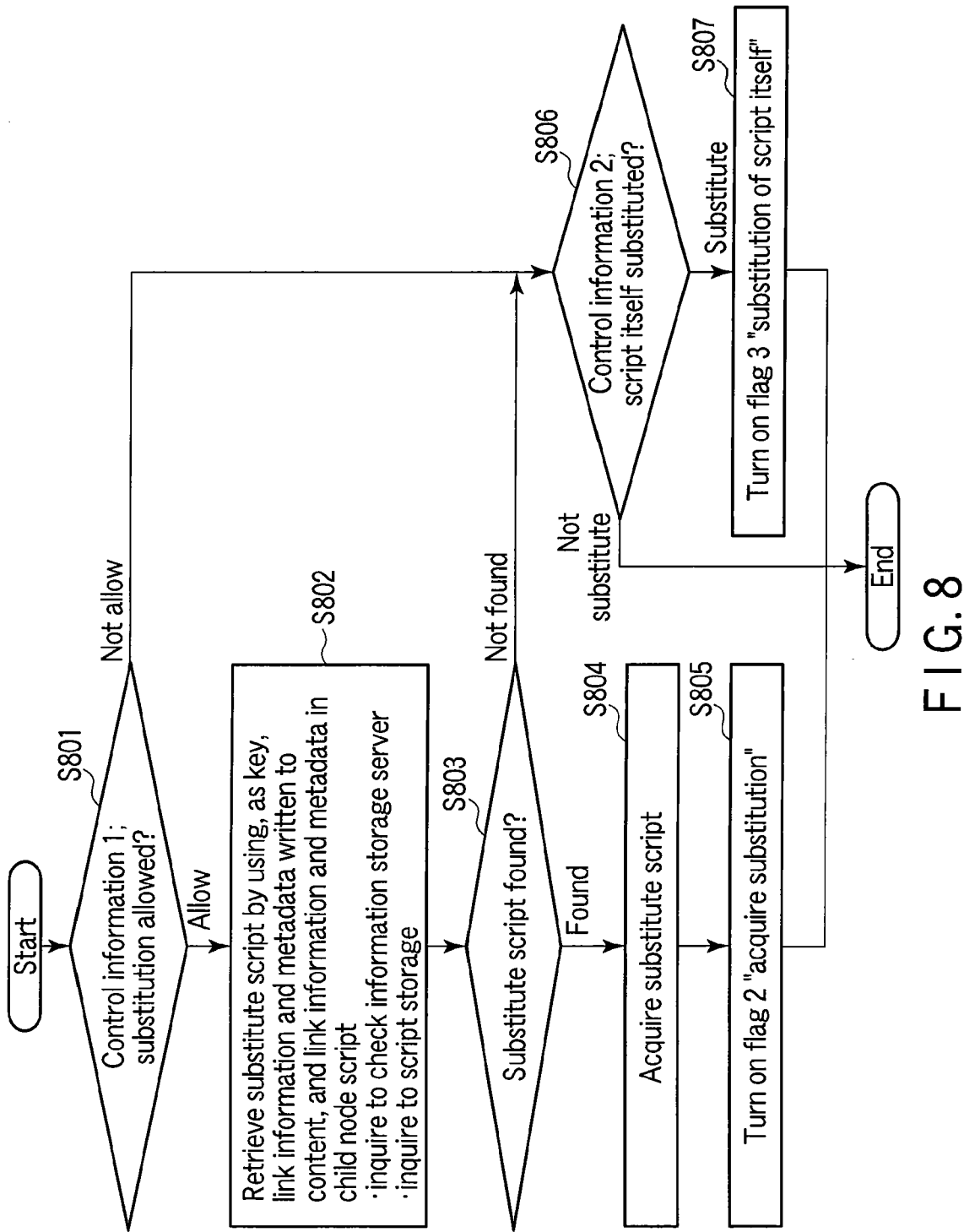
FIG. 8 is an exemplary flowchart depicting operations of a substitute script retrieval unit and of a substitute script acquisition unit.

In the case of the child node script, the script analysis unit 102 proceeds to Step S608, acquires "id" described on the link to the child node script from the script storage unit 101, and performs processing of the newly acquired script from "START" in a flowchart of FIG. 6 in the same way as that of the original child node script. The processing of the child node script analyzes whether or not a further new script is included in the child node script; if a new script is included, the script analysis unit 102 performs processing of the new script, and sequentially performs in advance up to a child node not including a new script in the play list of the script, namely, up to a child node including solely content in the play list. If there is no new script in the play list of the child node script, the script analysis unit 102 ends the processing in the child node script to shift to the processing of the node script on one higher order, and analyzes whether or not a new script exists. In this way, when the script analysis unit 102 ends recursive processing of the child node script and returns to processing on one higher order node, the script flag check unit 106 checks the acquisition situation of the child node script (Step S609).

In terms of the acquisition situation of the child node script, the case in which the processing of the child node script results in "off" of the flag 3 is defined as success. However, in another embodiment, control information showing "substitute content should not be included as control information" may be added. In this case, the case in which the processing of the child node script results in "off" of the flag 2 is defined as success.

If the acquisition of the child node script is determined as a success, the processing is returned from the script flag check unit 106 to the script analysis unit 102, the flag 1 "acquisition success" is turned "on" for the one subject under processing of the play list (Step S606), and acquisition of the next one subject of the play list is attempted to proceed to processing in Step S611. If the next one subject exists, the script analysis unit 102 returns to Step S602 to perform the processing again. If the next one subject does not exist, the script analysis unit 102 proceeds to Step S612.

<Retrieval and Acquisition of Substitute Script>

In Step S609, if the acquisition of some of the child node scripts end in failure, the processing of "retrieval and acquisition of substitute script" in Step S610 is performed. To perform this processing, the processing shifts to "START" in FIG. 8. The concrete processing in Step S610 will be described with reference to FIG. 8.

Firstly, the content of the control information 1 is checked in relation to one subject under processing of the play list (Step S801). If the content of the <alternate> tag that is the content of the control information 1 is "yes", the script analysis unit 102 determines that the substitution is allowed, and proceeds to Step S802 to shift to retrieval processing in the substitute script. If the content of the control information 1 is "no", the script analysis unit 102 does not substitute the script and proceeds to Step S806 in order to check the content of the control information 2.

The retrieval of the substitute script is performed by using URLs of metadata and content described in the script, URLs of metadata and content described in the child node script, or metadata and content themselves in a part of items of acquired content as keys, by inquiring to the external check information storage server 153 or by matching with the script storage unit 101. If the acquired key is text information, while the retrieval of the substitute script is performed on the basis of perfect matching, partial matching may be adopted by retrieving related words on the basis of another dictionary and may be retrieved on the basis of the related words. To retrieve the substitute script, describing the retrieval method to be adopted in the script is one possible approach. If a part of items of content which have been successfully acquired from the script is data (image, voice, moving image, etc.) other than a text, the substitute script retrieval unit 107 may perform signal processing such as image recognition and voice recognition and may use results of the signal processing as a key for the retrieval.

To retrieve the substitute script, while an inquiry to the check information storage server 153 or the cache (script storage unit 101, etc.) in the system is assumed, if both the server 153 and the cache are available, it is considered to decide by the system or specify on the parent node script which of them should be taken preference. The priority of the inquiry may be directly described on the parent node script.

In Step S803, if a substitute script has been found, the substitute script acquisition unit 108 acquires the substitute script (Step S804), and turns "on" the flag 2 "acquisition of substitution" for the one subject under processing of the play list (Step S805). The substitute script acquisition unit 108 sends this flag 2 to the flag storage unit 109, and returns to Step S610 from "END".

If a substitute script has not been found, the script analysis unit 102 proceeds to the content check of the control information 2 in the same way as that of the case in which the check of the control information 1 results in "no" (Step S806). If the content of the control information 2 is "yes" (perform substitution of the parent node script itself), the flag 3 "substitution of parent node script itself" is turned "on" for the one subject under processing of the play list (Step S807), and the processing is returned from "END" to Step S610.

If the content of control information 2 is "no" (does not substitute the parent node script itself), the flag 3 "substitution of the parent node script itself" remains "off", and the processing returns from "END" to Step S610.

When completing the processing of the one subject in the play list, the script analysis unit 102 checks whether or not there is a description on the next content of the child node script in the play list (Step S611). In the case of existence of the next one subject, the script analysis unit 102 returns to Step S602, and reads the next one subject in the play list to perform the same processing.

If the next one subject does not exist, the script analysis unit 102 results in completion of the processing of all items of content and child node scripts in the play list, and shifts to a merger of a flag of the processing result in the play list of the parent node script (Step S612).

In Step S612, the script change unit 110 performs merger processing of the flag of the processing result owned by each play list. The result in which the flag for each play list is merged by the entire of the play lists is used as a processing result of the child node scripts in the parent node script in the script under processing. If the script under processing is the child node script called out from a certain parent node script, when the processing of "END" in FIG. 6 is completed, the processing is returned to Step S608 of the parent node script. Then this processing result is utilized for checking the flag in Step S609, and for merging the flags when the processing of the play list of the parent node script ends.

A merging method of flags is as follows:

Flag 1: merger of "acquisition success"

When acquisition of content and a child node script is succeeded, the flag 1 is turned "on". If at least one script has been turned "off", since the child node scripts and the items of content have not been acquired perfectly, the resulting logical AND operation of the flags is defined as a merger result.

Flag 2: merger of "acquisition of substitution"

When the flag 2 fails in acquisition of content and child node scripts, but when the retrieval and acquisition of the substitute content is completed successfully, the flag 2 is turned "on". If at least one of items of content and child node scripts wherein the substitute is acquired is present, since the substitution has been performed anywhere, the resulting logical OR operation of the flags is defined as a merger result.

Flag 3: merger of "substitution of the parent node script itself"

When the flag 3 fails in both acquisition and substitution of content and child node scripts, and further, when the control information 2, namely the substitution of the parent node itself, is "yes", the flag 3 is turned "on". If at least one of items of content and child node scripts wherein the failure in acquisition and substitution requires the substitution of the parent node script itself is present, since the flag 3 is a flag indicating the substitution of the script itself, the resulting logical OR operation of the flags is defined as a merger result.

When the merger of the flags of the scripts is completed, the script change unit 110 rewrites the scripts (Step S613). Updated scripts may be stored in the script storage unit 101, and the scripts of which the content cannot be acquired may be rewritten.

When the rewriting processing of the scripts is completed, the processing of one script is completed, and the processing returns to the script analysis unit 102. At this time, if the parent node script is present in the script under processing, the script analysis unit 102 returns to the "processing of the child node scripts" in Step S608, and restarts the processing of the parent node script. If no parent node script exists, the script analysis unit 102 determines that the processing of the scripts of the tree structure of all the scripts is completed, namely, determines that the processing of all the scripts is completed, and performs output processing to the outside.

<Example of Script Rewriting>

Hereinafter, examples of actual script rewriting in the script change unit 110 will be described with reference to FIGS. 4 and 5, and FIGS. 9-18 that are description examples of the scripts. A script "marumaru_weather" of FIG. 5 has a relationship to the called out as a child node script from a script "morning_news" of FIG. 4. The script change unit 110 performs rewriting of the script in any one of the following three cases 1) to 3):

1) Rewriting by substitution of content
2) Rewriting by substitution of script
3) Deleting from script without substituting script and content.

In the embodiment, the writing processing performed by the script change unit 110 is performed for each one script, after determination of acquisition conditions of a substitute script and after acquisition of substitution content or substitution script. Therefore, in terms of the content to be changed in the scripts, the system refers to the flags stored in the flag storage unit 109 to rewrite the scripts. The flag may be stored in an inner memory or a cache, and the script change unit 110 may rewrite the scripts with reference to the flag information.

<Example of Substitution of Content>

Substitution content will be described with reference to FIGS. 4 and 5, and FIGS. 9-11. When the control information 1 is "yes", and when the flag 2 is turned "on" by acquiring substitute content, the content is substituted.

Figure 9:
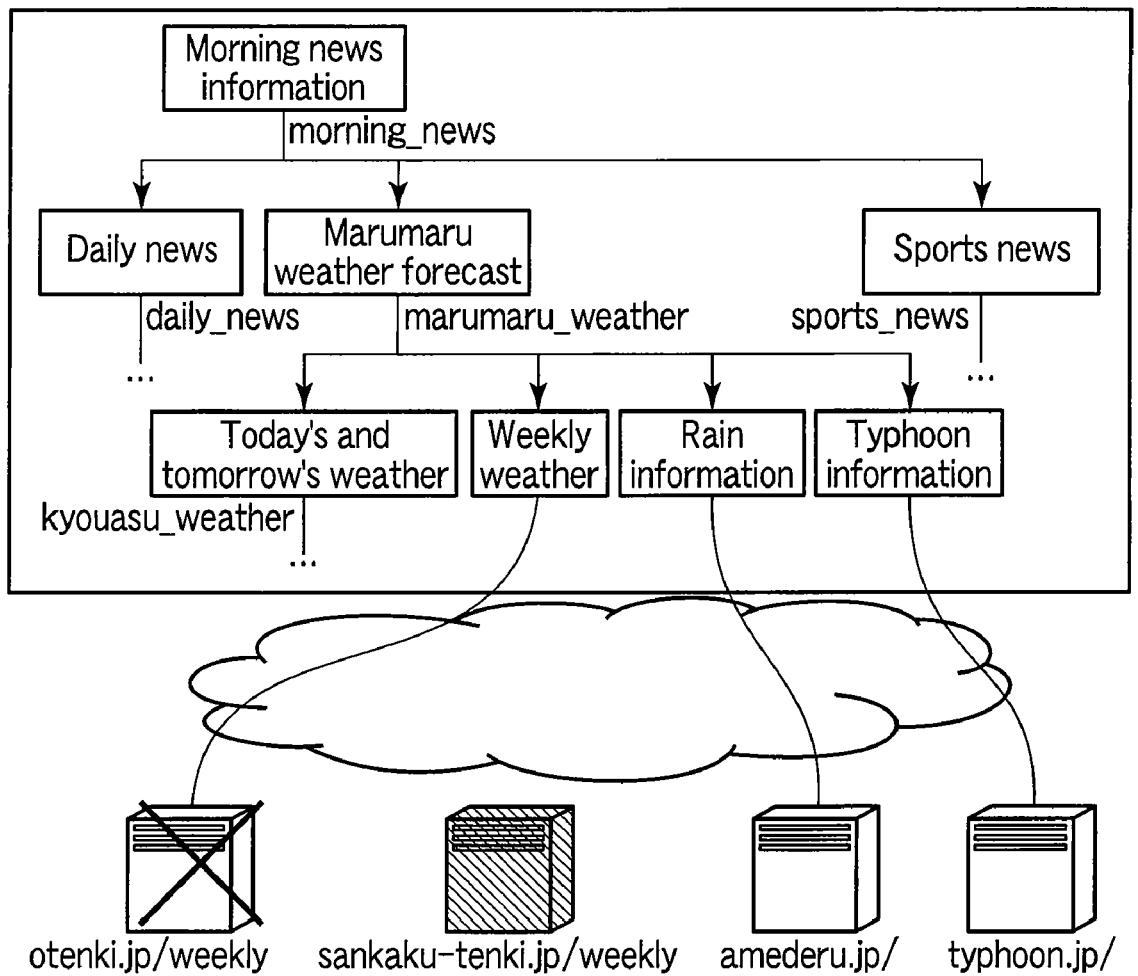
FIG. 9 is an exemplary view depicting an example of a state before substituting in substitution of content.
Figure 11:
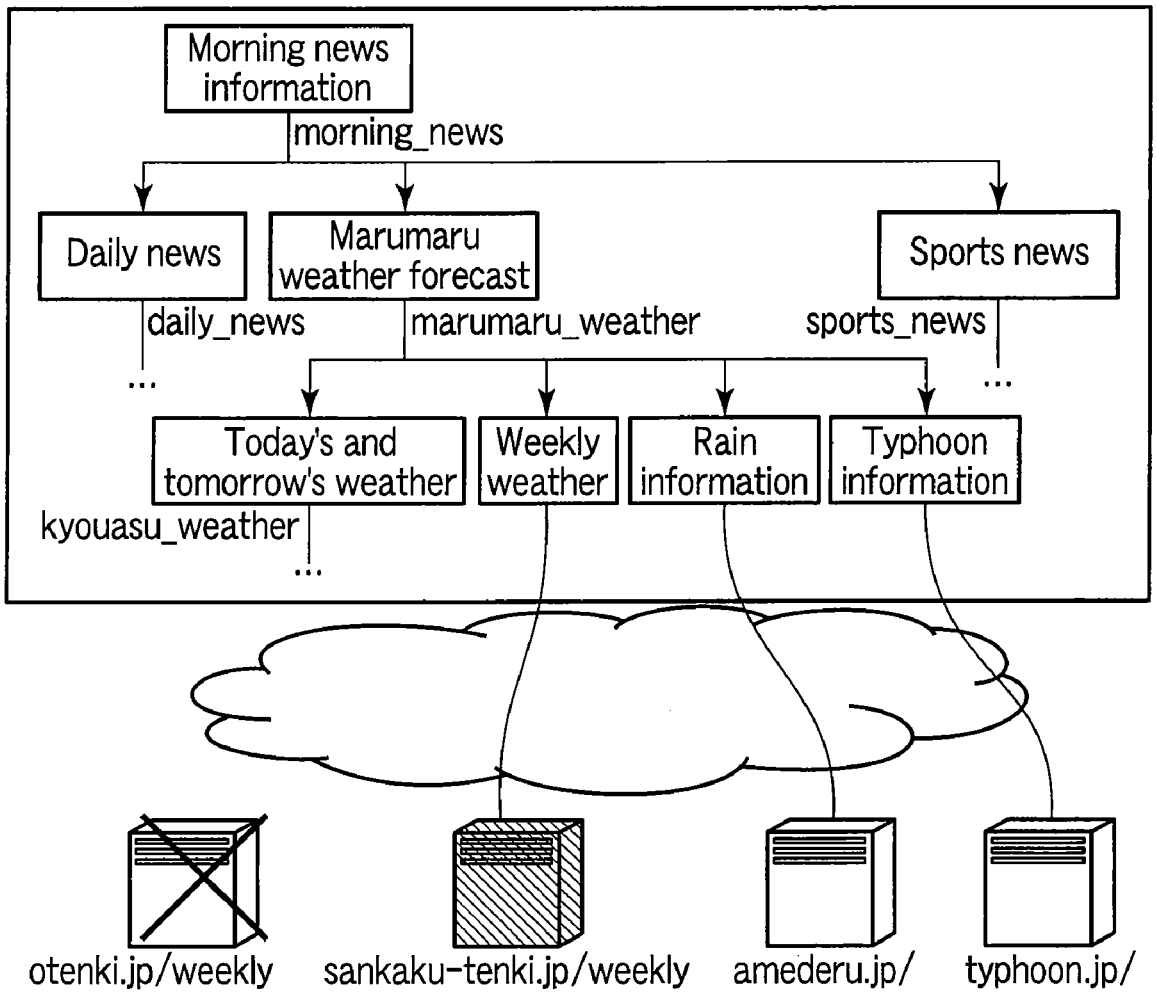
FIG. 11 is an exemplary view depicting an example of a state after performing substitution in substitute content.

As shown in FIG. 9, a state in which a content URL "otenki.jp/weekly" that is the second content of FIG. 5 is taken into account. In this case, since the <alternate> tag is "yes", substitute content in the case where this content cannot be obtained is retrieved. An example, in which a content description part "otenki.jp/weekly" of the script of FIG. 5 is rewritten in a content description of "sankaku-tenki. jp/weekly", is shown in FIG. 10. At this time, if content of a content URL "sankaku-tenki.jp/weekly" has been found, a configuration example of content will be shown in FIG. 11.

<Example of Substitution of Parent Node Script>

Next, the substitution of the parent node script will be described with reference to FIGS. 4 and 5, and FIGS. 12-15. When it is determined that the parent node script itself is needed, when the flag 3 is turned "on", and when the retrieval and acquisition of the substitution of the parent node script is completed successfully, on confirmation of the child node script acquisition information shown in FIG. 6, the parent node script is substituted.

Figure 12:
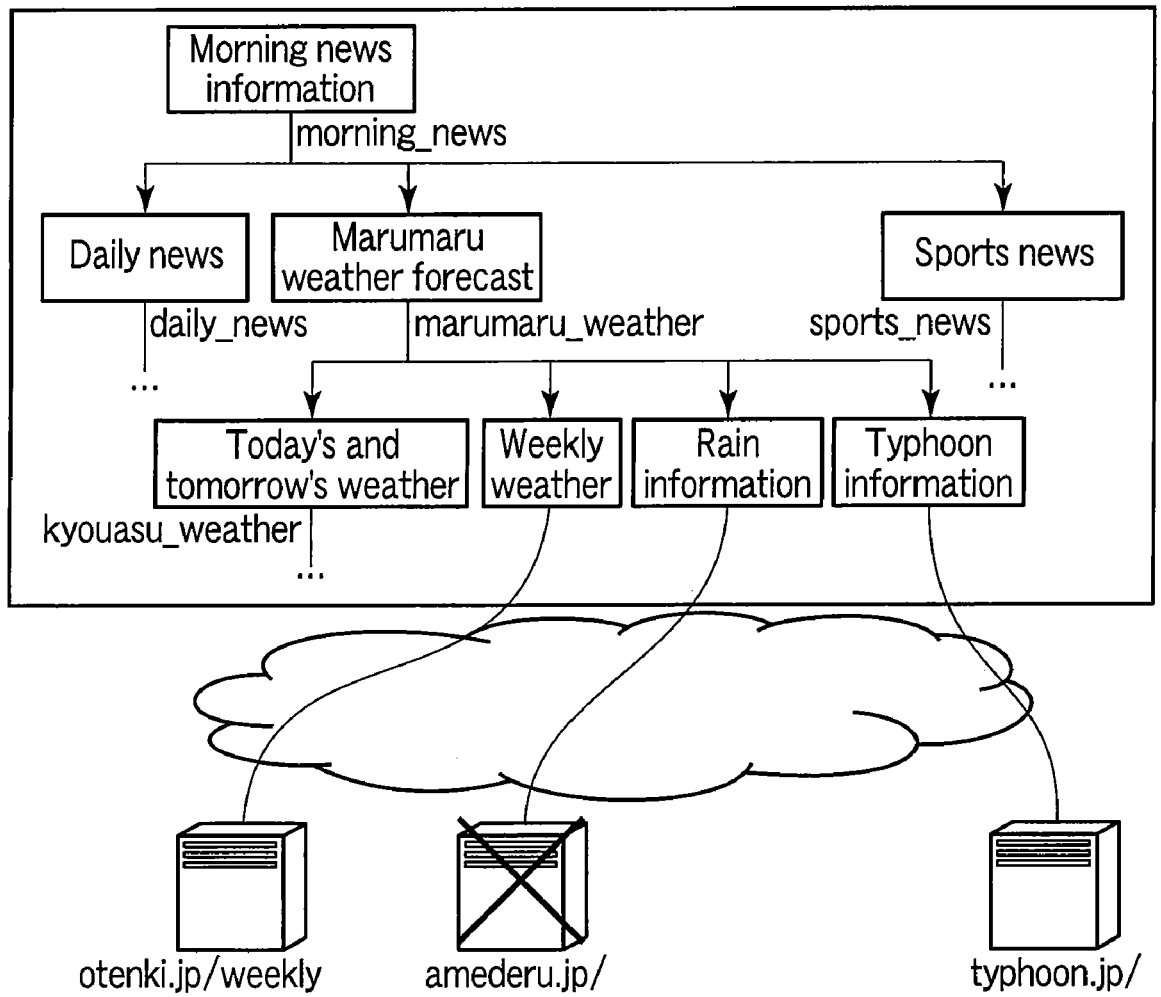
FIG. 12 is an exemplary view depicting an example of a state before performing substitution of a substitute script.
Figure 15:
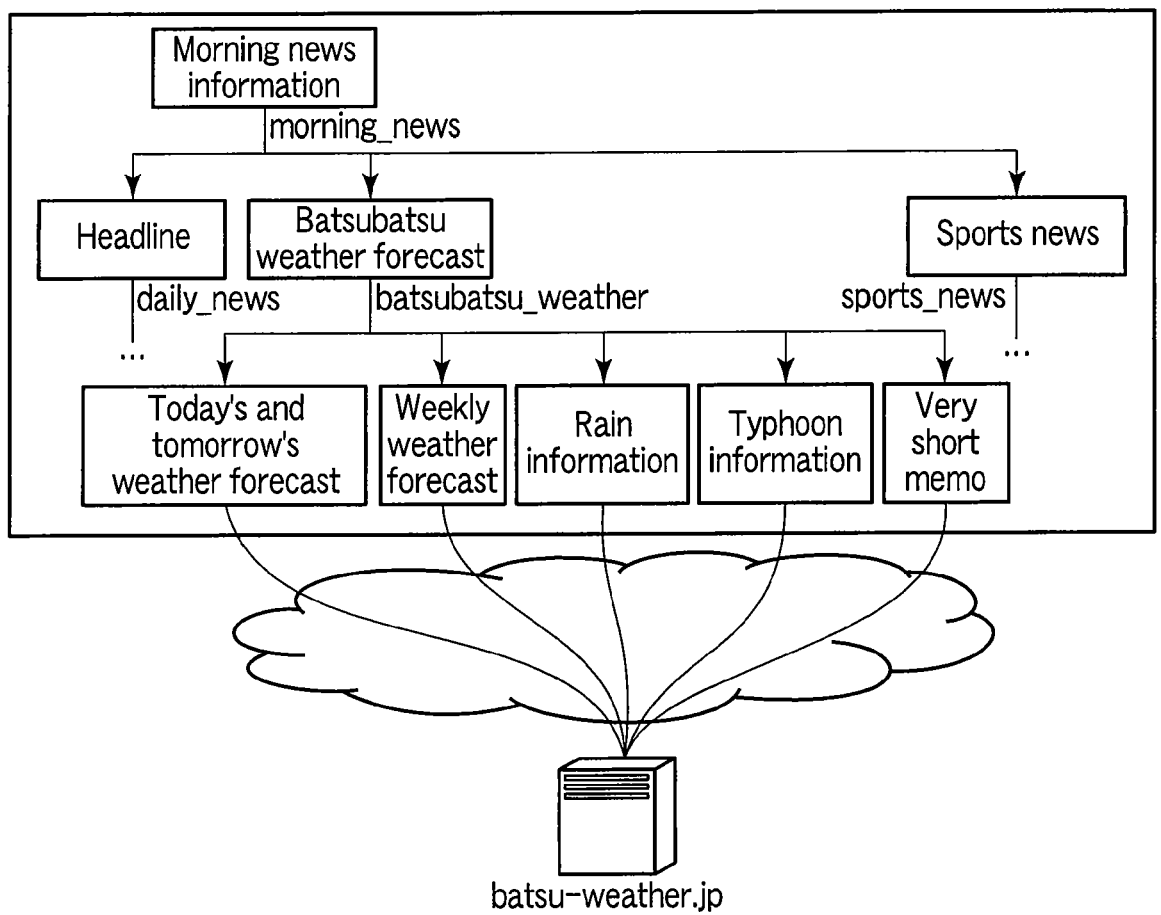
FIG. 15 is an exemplary view depicting an example of a state after substitution of the substitute script.

As shown in FIG. 12, the case where the acquisition of a content URL "amederu.jp/" ends in failure is taken into account. In this case, in control information of the content URL "amederu.jp/" of FIG. 5, the <alternate> tag is "no" and the <mamdatory> tag is "yes", so that the substitution of "marumaru_weather" itself that is a parent node script including the "amederu.jp/" becomes necessary. At this time, a substitute script having a similar <meta> tag is retrieved by using content of metadata of each, namely, a child element of a <meta> tag as a key, in this example.

In the example of FIG. 5, "Today's and tomorrow's weather" as a <keyword> tag included in the child node script "kyouasu_weather", "Weekly weather" as a <keyword> tag included in the content URL "otenki.jp/weekly", "Rainfall information" and "Amederu" as a <keyword> tag included in a content URL "amederu.jp/", and "Typhoon information" as a <keyword> tag included in a content URL "typhoon.jp/" are described, respectively. Based on these keys, an example of content which has been found as a result of retrieval is shown as a description example of a substitute script on "batsubatsu_weather" of FIG. 13 in consideration of separation of content to be substituted for each child node script and content. FIG. 14 shows an example of rewriting of the script of FIG. 4 so as to include "batsubatsu_weather". The configuration example of the content at this time will be shown in FIG. 15; "marumaru_weather forecast" that is a parent node script such as "rainfall information" is replaced with "batsubatsu_weather forecast", and content acquisition place is also changed.

<Delete from Script without Substation of Script and Content>

Next, the case of deletion from a script without any substitution of a script and content will be described with reference to FIGS. 4 and 5, and FIGS. 16-18. The deletion from the script without the substitution of the script and the content is performed in a case where the acquisition and the substitution of the child node script and the content end in failure, and where it is determined, of the control information 2 in FIG. 7 or FIG. 8, that the substitution of the parent node script itself is not performed, namely, the <mandatory> tag is set to "no".

Here, the case where the acquisition of the content URL "typhoon.jp/" ends in failure is taken into account as shown in FIG. 16. In this case, in the control information of the content URL "typhoon.jp/" of FIG. 5, the <alternate> tag is set to "no", and the <mandatory> tag is set to "no". Therefore, the substitution of the "typhoon.jp/" and the substitution of the parent node script are not performed; then, the content URL "typhoon.jp/" is deleted from the script of FIG. 5. The script description example of the result of deletion of the content URL "typhoon.jp/" from the script of FIG. 5 is shown in FIG. 17. The configuration example of the content at this time will be shown in FIG. 18, and the description of a title of "Typhoon information" will be deleted.

While a rough processing procedure of a system, reads one script as a parent node script to be a base from the script storage unit 101, the processing of script in all leaf nodes (child nodes) has been completed, and outputs the script after acquisition, substitution or deletion of all items of content, the content may be output at every time when the content in one script can be acquired not after the acquisition of all items of the content, and the content may be output in descending order of acquired content.

According to the above described embodiment, the information processing apparatus automatically retrieves the substitution to substitute content and/or script, in response to parameters when the acquisition of the contents is ended in failure, by putting the parameters for the control information whether or not substitution for each content and for each child node script in the script should be performed or for the control information whether or not substitution of the parent node script should be performed. At this time, a plurality of scripts are configured by a tree structure, and an acquisition result of the content and an acquisition result of a substitute content when the acquisition ends in failure are transferred to the parent node (parent node script) in order of leave node (child node script). Thereby, while having respect for intention of a script provider, a change range to the original scripts may be suppressed at a minimum and a processing unit to replace with a substitute script may be changed flexibly. As a result, the information processing apparatus can continuously provide the script and the content configured in accordance with the script to the user.

The flow charts of the embodiments illustrate methods according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a first storage unit configured to store a plurality of scripts each of which comprises a tree structure, each of the scripts including a first child node script and first content,
the first child node script indicating a first link to a child node of the script and including first script control information and second script control information, the first script control information indicating whether or not a substitute child node script substituting for a script of the child node is retrieved when acquisition of the script of the child node ends in failure, the second script control information indicating whether or not a first substitute parent node script substituting for a parent node script is retrieved, the parent node script indicating a script of a parent node, the first content including first content control information and second content control information, the first content control information indicating whether or not substitute content substituting for the content is retrieved when acquisition of the content ends in failure, the second content control information indicating whether or not a second substitute parent node script substituting for the parent node script is retrieved,
a script analysis unit configured to select one script as the parent node script among the scripts, analyze whether or not the substitute child node script and the first substitute parent node script are retrieved with reference to the first script control information and the second script control information that are included in a second child node script, respectively, the second child node script indicating a third link to a third child node script, analyze whether or not the substitute content and the second substitute parent node script are retrieved with reference to the first content control information and the second content control information that are included in second content, respectively, the second content indicating a fourth link to third content, and acquire a third child node script and further analyze the third child node script if the third child node script exists, the third child node script being included in the third link;
a content acquisition unit configured to acquire the third content indicating the fourth link if the third content exists;
a substitute content retrieval unit configured to retrieve the substitute content if the acquisition of the third content ends in failure and if the script analysis unit analyzes that first content control information of the second content indicates retrieving the substitute content;
a substitute script retrieval unit configured to retrieve the substitute child node script if the acquisition of the third child node script ends in failure and if the script analysis unit analyzes that first script control information of the script of the child node indicates retrieving the substitute child node script, and to retrieve the substitute parent node script when one of the second content control information of the second content and the second script control information of the second child node script shows retrieving the substitute parent node script;
a substitute content acquisition unit configured to acquire the substitute content when the substitute content is found;
a substitute script acquisition unit configured to acquire the substitute child node script and the substitute parent node script when the substitute child node script and the substitute parent node script are found, respectively; and
an acquisition unit configured to acquire a change script, in which at least one of first substitute content indicating a storage place of the substitute content as which the second content is rewritten, a first substitute child node script indicating a fifth link to the substitute child node script as which the second child node script is rewritten, and a substitute parent node script as which the parent node script is rewritten, is changed.

2. The apparatus according to claim 1, wherein the parent node script is a parent node contained in at least one of the content and the child node script, and is a parent node which is one higher layer in the tree structures of the content and the child node script.

3. The apparatus according to claim 2, further comprising a content cache unit configured to store a cache of the content or the third content to be substituted,
wherein a first content server, a second content server, a script server, and an external server are connected to the apparatus, the second content server including content different from that of the first content server,
the content acquisition unit is configured to acquire the third content from the first content server,
the script analysis unit is configured to acquire the third child node script from the first storage unit,
the substitute content retrieval unit is configured to retrieve the substitute content from the external server and the content cache unit,
the substitute script retrieval unit is configured to retrieve the substitute child node script and the substitute parent node script from the external server and the first storage unit,
the substitute content acquisition unit is configured to acquire the substitute content from the second content server, and
the substitute script acquisition unit is configured to acquire the substitute child node script and the substitute parent node script from the script server and the first storage unit, respectively.

4. The apparatus according to claim 1, wherein the script analysis unit is configured to include a first procedure and a second procedure, when a new script is included in an attention script, the new script is analyzed by the first procedure whether or not the new script further includes a new script, or when a new script is not included in the attention script, the second procedure returns to a script that is a node of one higher layer than the attention script, the script is analyzed by the second procedure whether or not the script that is the node of one higher layer further includes a new script, and the script analysis unit is configured to apply the first procedure and the second procedure to the second child node script.

5. The apparatus according to claim 4, further comprising:
a second storage unit configured to store a plurality of first flags each indicating whether or not acquisition of the third content and the third child node script are completed, a plurality of second flags each indicating whether or not at least one of substitutions of the third content and the third child node script exists, and a plurality of third flags each indicating which of the second content control information of the second content and the second script control information of the second child node script substitutes the parent node script itself,
wherein the substitute script retrieval unit is configured to retrieve a substitute parent node script of the parent node script when one of the third content and the third child node script satisfies the third flag.

6. The apparatus according to claim 1, wherein the change unit is configured to store the change script in the first storage unit.

7. The apparatus according to claim 1, wherein the failure in acquisition of the third content caused by that the first content server does not temporarily or permanently provide the third content, or caused by that the third content in a storage place of the second content can not use because of changing of a use condition of the third content.

8. An information processing method comprising:
storing a plurality of scripts each of which comprises a tree structure, each of the scripts including a first child node script and first content,
the first child node script indicating a first link to a child node of the script and including first script control information and second script control information, the first script control information indicating whether or not a substitute child node script substituting for a script of the child node is retrieved when acquisition of the script of the child node ends in failure, the second script control information indicating whether or not a first substitute parent node script substituting for a parent node script is retrieved, the parent node script indicating a script of a parent node,
the first content including first content control information and second content control information, the first content control information indicating whether or not substitute content substituting for the content is retrieved when acquisition of the content ends in failure, the second content control information indicating whether or not a second substitute parent node script substituting for the parent node script is retrieved,
selecting one script as the parent node script among the scripts,
analyzing whether or not the substitute child node script and the first substitute parent node script are retrieved with reference to the first script control information and the second script control information that are included in a second child node script, respectively, the second child node script indicating a third link to a third child node script,
analyzing whether or not the substitute content and the second substitute parent node script are retrieved with reference to the first content control information and the second content control information that are included in second content, respectively, the second content indicating a fourth link to third content,
acquiring a third child node script and further analyze the third child node script if the third child node script exists, the third child node script being included in the third link;
acquiring the third content indicating the fourth link if the third content exists;
retrieving the substitute content if the acquisition of the third content ends in failure and if first content control information of the second content indicates retrieving the substitute content;
retrieving the substitute child node script if the acquisition of the third child node script ends in failure and first script control information of the script of the child node script indicates retrieving the substitute child node script,
retrieving the substitute parent node script when one of the second content control information of the second content and the second script control information of the second child node script shows retrieving the substitute parent node script;
acquiring the substitute content when the substitute content is found;
acquiring the substitute child node script and the substitute parent node script when the substitute child node script and the substitute parent node script are found, respectively; and
acquiring a change script, in which at least one of first substitute content indicating a storage place of the substitute content as which the second content is rewritten, a first substitute child node script indicating a fifth link to the substitute child node script as which the second child node script is rewritten, and a substitute parent node script as which the parent node script is rewritten, is changed.

9. A computer readable, non-transitory storage medium including computer executable instructions, wherein the instructions, when executed by a processor, cause the processor to perform a method comprising:
storing a plurality of scripts each of which comprises a tree structure, each of the scripts including a first child node script and first content,
the first child node script indicating a first link to a child node of the script and including first script control information and second script control information, the first script control information indicating whether or not a substitute child node script substituting for a script the child node is retrieved when acquisition of the script of the child node ends in failure, the second script control information indicating whether or not a first substitute parent node script substituting for a parent node script is retrieved, the parent node script indicating a script of a parent node,
the first content including first content control information and second content control information, the first content control information indicating whether or not substitute content substituting for the content is retrieved when acquisition of the content ends in failure, the second content control information indicating whether or not a second substitute parent node script substituting for the parent node script is retrieved,
selecting one script as the parent node script among the scripts,
analyzing whether or not the substitute child node script and the first substitute parent node script are retrieved with reference to the first script control information and the second script control information that are included in a second child node script, respectively, the second child node script indicating a third link to a third child node script, analyzing whether or not the substitute content and the second substitute parent node script are retrieved with reference to the first content control information and the second content control information that are included in second content, respectively, the second content indicating a fourth link to third content, acquiring a third child node script and further analyze the third child node script if the third child node script exists, the third child node script being included in the third link;

acquiring the third content indicating the fourth link if the third content exists;

retrieving the substitute content if the acquisition of the third content ends in failure and first content control information of the second content indicates retrieving the substitute content;

retrieving the substitute child node script if the acquisition of the third child node script ends in failure and first script control information of the script of the child node indicates retrieving the substitute child node script, retrieving the substitute parent node script when one of the second content control information of the second content and the second script control information of the second child node script shows retrieving the substitute parent node script;

acquiring the substitute content when the substitute content is found;

acquiring the substitute child node script and the substitute parent node script when the substitute child node script and the substitute parent node script are found, respectively; and acquiring a change script, in which at least one of first substitute content indicating a storage place of the substitute content as which the second content is rewritten, a first substitute child node script indicating a fifth link to the substitute child node script as which the second child node script is rewritten, and a substitute parent node script as which the parent node script is rewritten, is changed.

10. An information processing apparatus configured to output plural contents according to a script, the apparatus comprising:

an acquisition unit configured to acquire a substitute content when acquisition of one of the plural contents is failed; and a change unit configured to change the script when the substitute content is acquired, wherein the script comprises items of script in a tree structure, each of the items comprising a play list comprising a first link to a child script and a second link to a content, wherein the first link comprises first control information indicating whether or not a substitute script is to be acquired when acquisition of the child script is failed;

the second link comprises second control information indicating whether or not a substitute content is to be acquired when acquisition of one of the contents is failed; and the acquisition unit is configured to acquire a substitute script or a substitute content based on the first control information or the second control information, wherein the change unit is configured to change the first link based on the substitute script when the substitute script is acquired, to delete the first link when the substitute script is not acquired, to change the second link based on the substitute content when the substitute content is acquired, and to delete the second link when the substitute content is not acquired.

11. The apparatus according to claim 10, wherein the change unit configured to change the first link and the second link when acquisition of the child script or one of the plural contents is failed.

* * * * *